United States Patent [19]

Faria

[11] 4,374,917
[45] Feb. 22, 1983

[54] INFRARED PHOTOCONDUCTOR FOR ELECTROPHOTOGRAPHY OF A COPPER ACTIVATED MERCURY CONTAINING CADMIUM SELENIDE TELLURIDE

[75] Inventor: Sixdeniel Faria, Towanda, Pa.

[73] Assignee: GTE Products Corporation, Stamford, Conn.

[21] Appl. No.: 329,894

[22] Filed: Dec. 11, 1981

[51] Int. Cl.$^3$ ............... G03C 1/00; G03G 5/087; G03G 5/04
[52] U.S. Cl. .................................... 430/94; 430/95
[58] Field of Search .............. 430/94, 95, 135, 136; 252/501.1; 29/572

[56] References Cited

U.S. PATENT DOCUMENTS 3,647,430  3/1972  Hanada et al. ............... 430/94
4,286,035  8/1981  Nishizima et al. ............ 430/95

Primary Examiner—John E. Kittle
Assistant Examiner—John L. Goodrow
Attorney, Agent, or Firm—James Theodosopoulos

[57] ABSTRACT

A copper-activated mercury-containing cadmium selenide telluride infrared-responsive photoconductor.

4 Claims, 1 Drawing Figure

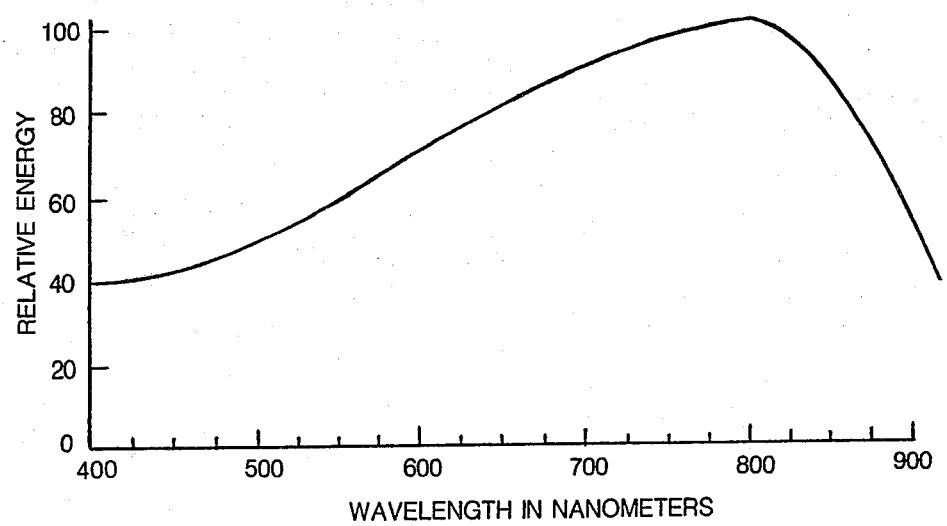

INFRARED PHOTOCONDUCTOR FOR ELECTROPHOTOGRAPHY OF A COPPER ACTIVATED MERCURY CONTAINING CADMIUM SELENIDE TELLURIDE

This invention relates to cadmium selenide photoconductors. Such photoconductors are disclosed in U.S. Pat. Nos. 3,975,306, 3,904,409, 3,743,609, 3,694,201, 3,647,430, 3,492,718, 2,958,932 and 2,866,878.

The peak response to electromagnetic radiation of such photoconductors is in the visible spectrum. However the development of copiers and printers that utilize low cost solid state lasers, for example, gallium aluminum arsenide, has generated the need for photoconductors that are responsive to infrared radiation. The gallium aluminum arsenide laser, for example, has strongest emission at about 800 nanometers.

This invention discloses a photoconductor that has good response to such infrared radiation. The photoconductor is copper-activated mercury-containing cadmium selenide telluride.

The FIGURE shows the spectral response of such a photoconductor.

One example of a photoconductor in accordance with this invention comprises copper-activated cadmium selenide in which 5 mol percent of the cadmium is replaced by mercury and 15 mol percent of the selenium is replaced by tellurium. The photoconductor was prepared by blending 0.80 mols of CdSe, 0.15 mols of CdTe and 0.05 mols of HgCl. In addition, 200 parts per million of copper was added as CdSe:Cu mix, 1 gram of mix containing 0.01 grams Cu. After thorough blending, the blend was fired at 450° C. for one hour in a nitrogen atmosphere. The sample was then wet sieved through a 500 mesh screen, washed with potassium cyanide, washed with deionized water to very low conductivity, and dried at 130° C. for four hours. The spectral response was measured with a microwave spectrometer and is shown in the drawing. It can be seen that peak response is at about 800 nm.

The spectral energy response of copper-activated cadmium selenide peaks at about 720 nm. A photoconductor in accordance with this invention should contain an amount of tellurium and mercury effective to shift said peak response to the infrared, say, beyond 720 nm. However, above about 20 mol percent tellurium content, the photosensitivity of the photoconductor is decreased. Similarly, above about 10 mol percent mercury content, the photosensitivity is also decreased.

I claim:

1. A copper-activated mercury-containing cadmium selenide telluride infrared-responsive photoconductor.

2. A copper-activated cadmium selenide photoconductor containing an amount of tellurium and mercury effective to shift the peak response of the photoconductor to the infrared.

3. The photoconductor of claim 2 wherein the amount of tellurium is less than about 20 mol percent.

4. The photoconductor of claim 2 wherein the amount of mercury is less than about 10 mol percent.